United States Patent [19]

Dorio et al.

[11] 4,116,781

[45] Sep. 26, 1978

[54] REJUVENATION OF MEMBRANE TYPE CHLOR-ALKALI CELLS BY INTERMITTENTLY FEEDING HIGH PURITY BRINES THERETO DURING CONTINUED OPERATION OF THE CELL

[75] Inventors: Martin M. Dorio, Mentor; Alan J. Stacey, Parma, both of Ohio

[73] Assignee: Diamond Shamrock Corporation, Cleveland, Ohio

[21] Appl. No.: 788,836

[22] Filed: Apr. 19, 1977

[51] Int. Cl.$^2$ .................... C25B 1/20; C25B 1/26; C25B 15/08; C25B 13/08

[52] U.S. Cl. .................... 204/98; 204/128; 204/296

[58] Field of Search .............. 204/98, 128, 296

[56] References Cited

U.S. PATENT DOCUMENTS

| | | | |
|---|---|---|---|
| 3,793,163 | 2/1974 | Dotson | 204/98 |
| 3,988,223 | 10/1976 | Hirozawa | 204/98 |

*Primary Examiner*—R. L. Andrews

*Attorney, Agent, or Firm*—John P. Hazzard

[57] ABSTRACT

Chlor-alkali cells of the membrane type are highly susceptible to multivalent metallic impurities in the brine feeds. As the impurity concentration builds up on and/or in the membrane material, cell voltage increases and current efficiency is lost. By the practice of the instant invention the membrane is rejuvenated and the current efficiency of the cell increased by intermittently replacing the normal brine feed thereto with a brine which is of relatively high purity with respect to the multivalent metallic impurities found in the normal brine feed. Generally, the pure brine feed should have little or no hardness (calcium and magnesium level) or, if present, the hardness should be completely complexed by a phosphate treatment. The other multivalent metallic impurities should be present in the "pure" brine at less than 2 milligrams per liter in total and preferably less than 1 milligram per liter thereof, while each individual other metallic contaminant should not exceed 0.5 milligrams per liter and preferably it would be below 0.2 milligrams per liter.

13 Claims, No Drawings

REJUVENATION OF MEMBRANE TYPE CHLOR-ALKALI CELLS BY INTERMITTENTLY FEEDING HIGH PURITY BRINES THERETO DURING CONTINUED OPERATION OF THE CELL

BACKGROUND OF THE INVENTION

The present invention is intended to improve both the economic and operational aspects of electrolytic units such as chlor-alkali cells which employ membrane separators between anolyte and catholyte chambers; and more specifically, to the periodic rejuvenation of such membranes which have been contaminated by multivalent metallic impurities found in the normal brine feed to such a chlor-alkali cell.

The electrochemical industry has long been concerned with the detrimental effects caused by impurities found in feed streams to the electrolytic cells. Initially, such chlor-alkali cells of the membrane type would be merely operated using the impure feed brine and operation of the cell would continue until the current efficiency dropped to an unacceptable level. Thereupon, the cell operation would be stopped and the membrane would either be replaced by a new membrane or the membrane which had been clogged with the impurities would be acid washed to remove such impurities on and/or in the membrane to rejuvenate the membrane. Such acid washing was effective provided the membrane was not irreparably damaged aged by contamination, but obviously caused down time for the electrolytic cell being cleaned.

Thereafter, another means of extending cell operation was developed which sequestered the polyvalent metallic cations in the brine prior to coming in contact with the membrane in a chlor-alkali cell. This development as fully described in U.S. Pat. No. 3,793,163 consisted of adding phosphoric acid or the like to the brine feed so as to sequester the polyvalent impurities which decreased the life expectancy of the membrane used in the cell. Such treatment effected excellent results when the impurities found in the brine feed consisted of hardness impurities (calcium and magnesium), and the like but was wholly ineffective with respect to such impurities as mercury. Likewise, other polyvalent impurities found in the brine such as iron, manganese, cobalt, nickel, copper, zinc, aluminum and the like would not be kept in their entirety from entering the membrane. Thus, although such phosphoric acid treatments lengthen the normal life of a membrane, resort still had to be made to discontinuing operation of the cell and acid washing the membrane or replacing the same with a new membrane. Thus, continuous operation still was not possible and nonproductive periods were a necessity so as to clean contaminated membranes.

The other obvious answer to this dilemma was to purify the brine of its contaminating polyvalent metallic impurities prior to feeding it to the electrolytic cell. Numerous method, of course, were known to so purify the brines. For example, East German Patent No. 49,347 published Aug. 5, 1966 discloses the purification of alkali metal salt solutions of their contaminating trace metal impurities by the use of ion exchange which quantitatively removes such trace metal impurities so that the most sensitive detection methods could not detect them. Particularly disclosed in the East German Patent is the use of iminodiacetic acid type ion exchange resin which would be similar to Dowex A-1. A more detailed discussion of the use of this type ion exchange resin to remove trace metal impurities can be found in Japanese Patent Application Public Disclosure No. 86,100 published July 28, 1976.

Purification of the brine feed prior to electrolysis does in fact maximize the life expectancy of a membrane in a chlor-alkali cell. However, the cost of such purification is extremely high and it has in fact prevented such treatment from being practiced commercially since the cost per unit of product produced remains cheaper in the practice of the phosphoric acid brine treatment in spite of the required shut downs to clean and/or change membranes.

BRIEF SUMMARY OF INVENTION

The present invention overcomes these drawbacks of the prior art teachings by intermittently changing from an impure brine feed to a pure brine feed when the cell efficiency has decreased to an unacceptable level to thereby rejuvenate the membrane and restore the cell efficiency without disrupting cell operation and production. Surprisingly it has been found that such intermediate feeding of pure brine apparently removes the impurity build up on and/or in the membrane and restores the membrane efficiency to substantially its original values.

Normally, the intermittent operation of a chlor-alkali cell on high purity brine requires such pure feed 20% or less of the time on stream to give continuous high level performance of the cell. Of course, the impurity levels found in the impure brine feed dictate the frequency required for washing the contaminated membrane with pure brine feed during continued operation and such intermittent feeding of pure brine can be revised accordingly. Preferably however, it is preferred to monitor the current efficiency or voltage of the cell and to feed pure brine when the current efficiency declines to a given degree and/or the voltage increases to a preselected level. The purity level of the so called pure brine feed can vary extensively and is primarily dependent on the impurities and the levels thereof found in the normal brine fed to the cell. If the brine normally fed to the cell is high in only detrimental multivalent metallic impurity, the so called pure brine feed which is intermittently fed to the cell need only be of high purity with respect to the same impurity found in the impure brine feed. Normally however, natural brines will contain a large number of such multivalent impurities and such impurities can be normally broken down in two groups, hardness impurities and other multivalent metallic impurities. In the practice of the present invention, the hardness impurities or at least those available to contaminate the membrane should be eliminated by purification methods such as ion exchange or rendered non-contaminating by means of phosphate treatment as disclosed in U.S. Pat. No. 3,793,163. The other metallic multivalent impurities should as a group not total more than approximately 2 milligrams per liter and preferably should total less than 1 milligram per liter. Each such other multivalent metallic impurity should always be less than approximately 0.5 milligrams per liter and preferably less than 0.2 milligrams per liter. Such other multivalent metallic impurities include aluminum, beryllium, cobalt, chromium, copper, iron, mercury, magnesium, molybdenum, nickel, silicon, titanium, vanadium, and zinc.

DETAILED DESCRIPTION OF THE INVENTION

Economics dictate that any electrolytic cell be operated continuously at the highest practical efficiency. Electrolytic cells employing membrane separators between anolyte and catholyte yield products of higher purity, but at the same time such membrane type electrolytic cells are more difficult to operate continuously since the membranes are susceptible to low level impurities normally found in feeds to such cells. To date, the efficiency of such membrane type electrolytic cells has been maximized by either highly purifying the feed material or the cell is merely run until the current efficiency decreases at which time the electrolysis is stopped and the membrane removed for acid washing.

The present invention permits continuous operation of a membrane cell utilizing predominantly standard unpurified brine and at the same time maintain maximum efficiency in the cell by intermittently feeding such electrolytic cell with a purified feed material so as to reverse the impurity build-up on or in the membrane. This is possible in view of the fact that it has been discovered that the impurity levels of multivalent metallic impurities in a membrane can be removed with essentially complete recovery of efficiency in the electrolytic cell operation provided the degree of contamination of the membrane was not such as to cause irreparable injury; as for example, the driving force of the electric field forces the metallic impurities through the membrane causing rupture and irreparable damage thereto.

The instant invention while applicable to all membrane type electrolytic cells will be described hereinafter with respect to chlor-alkali cells and more particularly chlorine-caustic cells for ease of description.

Generally, brine fed to chlorine-caustic electrolytic cells in commercial practice contain two types of impurities which greatly affect the efficiency of membrane type cells. Generally, such brine feeds contain unacceptable levels of hardness impurities. These hardness impurities which consist of both calcium and magnesium impurities if not removed from the feed will precipitate on or within the membrane and ultimately plugs the membrane decreasing current efficiency to unacceptable levels. These hardness impurities must be removed from the brine feed or sequestered therein prior to feeding the same to the cell. This can be accomplished by ion exchange treatment of the feed material or by the addition of phosphoric acid or the like to sufficient quantities to the brine so as to sequester the hardness impurities. Such phosphate treatment is described in detail in U.S. Pat. No. 3,793,163 and such disclosure is incorporated herein by reference. In general, this patent discloses a method for sequestering hardness ions by treatment with up to about 500 ppm (greater concentrations can be used but the effectiveness is not improved) of the various free acid and alkali metal phosphates, orthophosphates and metaphosphates which forms on "insoluble reversible gel". If the feed brine contains excessive hardness (over about 450 ppm Ca + Mg), such phosphate treatment alone will be insufficient and such brine must be chemically pretreated to bring the hardness level below 450 ppm or preferably below 200 ppm before phosphate treatment. Such chemical precipitation methods are well known in the art.

The other multivalent metallic impurities in the brine feed can vary greatly from brine source to brine source throughout the world. Generally, however, the standard brine source contains a number of multivalent impurities form the group aluminum, beryllium, cobalt, chromium, copper, iron, mercury, magnesium, molybdenum, nickel, silicon, titanium, vanadium, and zinc. These other multivalent metallic impurities must be removed from at least a portion of the brine feed so as on intermittent feeding of the purified feed to effect a removal of said multivalent metallic impurities from the membrane in the chlorine-caustic cell. In normal operation, a commercial cell would operated in accordance with the instant invention by feeding the available brine with hardness ions sequestered or removed but containing excessive levels of multivalent metallic impurities until the current efficiency began to decrease. When the efficiency descreased to a preselected level, the impure brine feed would be replaced with a brine feed containing low levels of said other metallic impurities which would result in the rejuvenation of the membrane to essentially the efficiency level originally possessed by the membrane. At that time, feeding of the normal impure brine would resume. In actual practice, we have found that commercial type membrane cells can be operated from 20–30 days using the standard brine feed containing impurities other than hardness impurities and such membranes can be rejuvenated by operation from 3 to 6 days on purified brine feeds. We have found that the purity level of the so-called pure brine feed with respect to multivalent metallic impurities other than hardness should have a total concentration of less than 2 milligrams per liter and preferably less than 1 milligram per liter since the effect of such impurities appear to be additive while each individual metallic contaminant should be less than 0.5 milligrams per liter and preferably held to less than 0.2 milligrams per liter.

The above purity levels are operable generally since most commercial brine feeds contain a large number of said other multivalent metallic impurities. However, it should be noted that extraordinary brine feeds which have impurity levels different from those generally found can be utilized in the broad concept of the instant invention. For example, if a so-called "impure" brine were found that contained only high levels of one such multivalent metallic impurity, the membrane rejuvenating "pure" intermittent brine feed need only be pure in its content of that specific multivalent metallic impurity. The so-called "pure" brine feed could actually be of low purity with respect to other multivalent metallic impurities not found in the normal so-called "impure" normal brine feed to the cell. Thus, in effect two impure brine feeds could be used intermittently to maintain cell efficiency during continuous operation provided the impurities in each of the brine feeds differed so as to remove the impurities from the other brine from the membrane so as to effect the membrane rejuvenation.

The degree of contamination of a membrane by a specific multivalent metallic impurity possible before irreparable damage is done to said membrane varies from impurity to impurity. This, of course, is due to the atomic radius of the metallic impurity, the particular membrane being used, and the strength of the electric field in the particular electrolytic cell. In tests using backed Nafion membrane at standard chlorine-caustic cell operating conditions for example, the mercury build-up in the membrane can go as high as approximately 60 milligrams of mercury per gram of backed membrane before irreversible current efficiency damage occurs. Thus, assuming mercury was the only multivalent metallic impurity in the brine feed, a commercial cell could be operated until the mercury level within the membrane reached appoximately 60 milligrams of mercury per gram of membrane before a brine pure in mercury content was fed thereto to rejuvenate the membrane to approximately its original current efficiency. However, since it would be most difficult to determine the mercury content of the membrane and to at the same time continue operation of the cell, we have correlated membrane contamination with loss in cell current efficiency so that current efficiency alone need be monitored to determine the frequency and length of intermittent feeding of pure brine to rejuvenate the membrane. In this study, we have found that membranes can be essentially completely rejuvenated if the loss in current efficiency is not allowed to exceed approximately 12%, preferably less than 10% of its original current efficiency no matter what impurity or combinations are present in the standard brine fed to such a membrane cell.

Thus, in actual practice, one need only know the impurities present in the normal brine feed and prepare and have on hand an intermittent brine feed which is low in the impurities found in the normal brine feed and to intermittently feed such purified brine feed to the cell before the current efficiency of the cell declines more than 12% of its original current efficiency to rejuvenate the membrane. Continued operation in this manner will essentially result in continuous highly efficient operation surrpassing that possible according to the prior art methods.

The particular type of membrane utilized in the chlor-alkali cells of the present invention or other electrolytic processes to which the instant invention is applicable could be any of those known to those skilled in the art. However, the preferred membranes of the instant invention are generally derived from (i.e., result from the saponification of) any fluorinated polymer having pendant side chains bearing sulfonyl, carboxyl or phosphonyl groups attached to carbon atoms, on each of which carbon atoms there is at least one fluorine atom. Such fluorinated polymers are prepared from monomers that are fluorinated or fluorine-substituted vinyl compounds. They are made from at least two monomers with at least one of the monomers coming from each of the groups (1) fluorinated vinyl compounds, such as vinyl fluoride, hexafluoropropylene, vinylidene fluoride, trifluoroethylene, chlorotrifluoroethylene, perfluoro (alkyl vinyl ether), tetrafluoroethylene, and mixtures thereof and (2) a sulfonyl, carboxyl or phosphonyl containing monomer containing the precursor $-SO_2F$, $-CO_2F$ or $-PO_2F$. Exemplary are $CF_2=CFSO_2F$ and, generically, $CF_2=CFY_fSO_2F$, wherein $Y_f$ is a bifunctional perfluorinated radical containing from 2 to 8 carbon atoms. More preferably, the hydraulically impermeable cation exchange membranes are those copolymers having the repeating structural units:

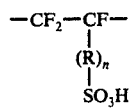

wherein $x$ is fluorine, chlorine or trifluoromethyl; and $x^1$ is $x$ or $F(CF_2)_a-O-$ wherein $a$ is an integer from 1 to 6.

In the copolymer there should be sufficient repeating units according to the last mentioned formulas above, to provide an $-SO_3H$ equivalent weight of about 800-1600, although lower and higher equivalent weights can be used also. Materials having a water absorption rate of about 25% or greater are preferred since higher cell potentials at any given current density are required for materials having less water absorption. Similarly, materials having a film thickness of about 8 mils or more require higher cell potentials resulting in a lower power efficiency. Normally the materials range from 3 to 15 mils is thickness with 3-8 mils being preferred.

Polymeric materials of this preferred type are further described in the following patents which are hereby incorporated by reference, U.S. Pat. Nos. 3,041,317; 3,282,875; 3,560,568; 3,624,053; 3,718,627; 3,969,285; and British Patent No. 1,184,321. Polymeric materials as described are available from E. I. Dupont deNemours & Company under their trademark NAFION.

The means for purifying the intermittently fed pure brine to the desired degree can be any method known to those skilled in the art. The procedure will vary based on the quantity and type of impurities present in the normally found brine feed at a given locale. Generally, however, a purified brine feed for the practice of the present invention may be conveniently obtained by treating the brine with an ion exchange resin so as to remove such metallic impurities to the desired degree. Often it is most economical to remove the majority of impurities present in a brine by means of conventional purification methods such as precipitation and filtration and to follow this rough purification procedure by an ion exchange resin technique. An ion exchange resin treatment useful in the present invention is effective because it forms of intramolecular complex with the multitude of multivalent metallic impurities present. Particularly effective are the ion exchange resins formed from polymers containing a functional group of the structure $N-CH_2OO^-$. Typically, these include such compounds as ethylene diamine tetra-acetic acid, trimethylenediamine tetra-acetic acid, and iminediacetic acid. Typical commercially available ion exchange resins useful for this purpose include Diamond Shamrock's Duolite C-433 and Dow Chemical's Dowex A-1.

The following examples are illustrative of the instant invention.

EXAMPLE I

A completely fluorinated copolymer containing pendant sulfonic acid groups was chosen as the membrane material for this and the following examples. The membrane material is available from E. I. Dupont deNemours & Company under the trademark NAFION. The particular membrane chosen was one formed from the polymerization of seven parts of tetrafluoroethylene and one part of $CF_2=CFOCF_2CF(CF_3)OCF_2CF_2SO_2F$, had an equivalent weight of 1200 (grams of polymer pre equivalent of proton), was reinforced by a T-12 woven PTFE fabric laminated to the membrane, and had a nominal thickness of 7 mils. This membrane was then treated on one side in an asymmetric vessel at a temperature of 26° Centigrade with an ethylene diamine/water solution (18:1 volume ratio) for 9 minutes, water washed, and removed from the treating vessel. Tests of the membrane showed that the ethylene diamine (EDA) treatment penetrated approximately 1.5 mils into the surface of the membrane. The membranes were then saponified at about 90° C for seventy minutes in a solution of 600 ml. water, 400 ml. dimethylsulfoxide and 13% by weight NaOH. Said membrane, after water rinsing, is immersed in an aqueous 150 g/l NaOH solution for four hours at room temperature, following which it is removed, blotted dry with absorbent toweling, and allowed to air dry for 24 hours again at room temperature.

Without further treatment, the membrane was installed in an electrolytic cell between an expanded steel mesh cathode and an expanded titanium metal anode bearing a 2 $TiO_2$:$RuO_2$ mole ratio coating on its surface. The cell was a 25 square inch cell and the electrode gap was approximately ¼ inch. A 350 g/l NaOH solution was initially added to the cathode compartment while saturated brine at a temperature of 25° C and a pH of about 0.8 was flowed through the anode compartment.

The brine fed during electrolysis was a so-called "pure" brine in the context of this invention in that the multivalent metallic impurities other than hardness contaminants totaled less than 2 mg/liter and the effective hardness concentration was effectively reduced below 0.5 mg/l by acid treatment. An analysis of this "pure" brine feed is as follows:

| | |
|---|---|
| Al | 0.13 mg/l |
| Be | <0.07 |
| Ca | 1.4 |
| Co | <0.004 |
| Cr | <0.005 |
| Cu | <0.2 |
| Fe | <0.2 |
| Hg | <0.02 |
| Mg | 0.3 |
| Mo | <0.02 |
| Ni | <0.01 |
| Si | <0.2 |
| Ti | <0.5 |
| V | <0.01 |
| Zn | <0.1 |
| NaCl | ~280 g/l |
| pH | <1 |
| $H_3PO_4$ | 375 mg/l |

As can be noted from the above analysis, phosphoric acid at an addition rate of 375 mg/l of brine was added to complex the hardness ions.

Utilizing a continuous brine feed, electrolysis was commenced at a current density of 2.0 ASI. After continued operation for over 90 days, cell operation was found to range from 4.4 to 4.6 volts while cathode current efficiencies remained above 90% throughout the test period.

EXAMPLE II

The experiment of Example I was here repeated utilizing an "impure" brine feed in that the "pure" brine feed of the earlier example was contaminated so that it contained 20 mg/l calcium carbonate and 20 mg/l mercury. Current efficiency decayed from an initial efficiency of 90+% to 78% in 10–12 days. Voltages were around 4.3 volts during the run.

EXAMPLE III

This example is intended to illustrate the recoverability of current efficiency effected by substitution of a "pure" brine feed in a contaminated membrane cell. The cell and operating conditions of Example I were utilized while the cell was operated initially on the "impure" brine of Example II. At startup, the current efficiency was approximately 95% and decayed gradually until after 21 days on line the current efficiency had decayed to 83%. At that point in time, the brine being fed to the cell was switched to the "pure" brine of Example I and over a period of 10 days continued operation of the cell the current efficiency gradually recovered to 93%. The voltage over the entire test period remained constant in the 4.9–5.1 volt range.

EXAMPLE IV

This example is intended to illustrate again the recoverability of the current efficiency by substitution of a "pure" brine feed after a membrane has been contaminated. However, in this example it will be noted that the decay was allowed to substantially exceed the 10% decay level required by the instant invention so that the loss in efficiency is not fully recoverable. In this run, the cell and operating conditions of Example I were again utilized. Initial operation of the cell was on the "pure" brine of Example I. During the first 29 days of operation, the current efficiency flocculated in the range of 92–99%. On day 30, the brine fed to the cell was switched to the "impure" brine of Example II. A gradual decline in current efficiency from 96% to 81% occurred over the next 20 days. At this point, the "pure" brine of Example I was once again fed to the cell. From day 49 after original startup to the 63rd day after startup using the "pure" brine, the current efficiency increased back to 90% at which time the pure brine fed was again replaced with an "impure" brine feed of Example II. And from day 64 after initial startup to day 78, the current efficiency gradually declined from 90% to 78%. Once again, "pure" brine feed of Example I was refed to the cell and from day 78 to day 105 the current efficiency of the cell improved from 78% to 85%. In this example, the decay of the current efficiency was allowed to proceed well beyond the 10% maximum of the instant invention and thus irreparable damage was done to the membrane thereby limiting the degree of recovery possible.

EXAMPLE V

In this example a membrane was impregnated with mercury to a level of approximately 38 parts per million. The membrane was placed in a 3 square inch cell and operated under the operating conditions of Example I using said "pure" brine, except that parallel nickel plates were used as the cathode. The initial current efficiency of the cell was approximately 90% as measured by caustic product production. After only one day's operation, current efficiency was found to improve to 92% and full recovery to 96–98% occurred within three days.

EXAMPLE VI

The procedure of Example V was repeated starting with a membrane which had bene impregnated with mercury to a level of approximately 70 parts per million. Operating on "pure" brine initially gave a current efficiency in the 67–69% range. Continued operation gradually improved the current efficiency to a maximum of 76%. Thus, it is clear that contamination of a membrane to this degree irrevocably damages said membrane so that the full initial current efficiency cannot be recovered.

In for foregoing examples, the current efficiencies given are accurate to plus or minus 2% and the voltage data are not significant since voltage effects depends on life of the membrane, temperature, electrode gaps, and the like.

What is claimed is:

1. The method of operating a membrane type chlor-alkali electrolytic cell so as to maximize current efficiency during long-term continuous operation comprising, feeding an impure brine solution containing membrane contaminating quantities of multivalent metallic impurities to said cell which gradually contaminates the membrane in the cell and causes a loss in current efficiency, replacing said impure brine feed with a pure brine feed containing less than 0.5 milligrams per liter of each multivalent metal contaminant found in said impure brine solution excluding complexed hardness ions for a period of time to improve the current efficiency and thereafter returning to feeding said impure brine solution, said replacement of the impure brine feed with said pure brine feed being made intermittently with sufficient frequency so as to prevent the current efficiency of the cell from dropping below 88% of the cell's original current efficiency.

2. The method of claim 1 wherein said pure brine feed is made from said impure brine feed by utilizing ion exchange resin to reduce the contaminants to the stated levels.

3. The method of operating a membrane type chlor-alkali electrolytic cell so as to maximize current efficiency during long-term continuous operation comprising; feeding an impure brine solution which has been treated with sufficient phosphate to complex dissolved hardness impurities therein and which contains membrane contaminating quantities of other polyvalent metallic impurities to said chlor-alkali electrolytic cell which gradually contaminates the membrane in the cell and causes a loss of current efficiency, intermittently replacing said impure brine with a pure brine feed which has been treated with sufficient phosphate to reduce complex hardness impurities therein and which contains less than 0.5 milligrams per liter of each multivalent metal contaminant found in said impure brine feed, said intermittent replacement of said impure brine feed with said pure brine feed being made after said impure brine has contaminated said membrane causing a decrease in current efficiency and with sufficient frequency so as to prevent the current efficiency of said cell from dropping below 88% of the cell's original current efficiency.

4. The method of claim 3 wherein said pure brine feed is made from said impure brine feed by utilizing ion exchange resin to reduce the contaminants to the stated levels.

5. The method of operating a membrane type chlor-alkali electrolytic cell so as to maximize current efficiency during long-term continuous operation comprising, feeding to said cell an impure brine solution containing multivalent metallic impurities which gradually contaminates the membrane in the cell and causes a loss in current efficiency, replacing said impure brine feed the current efficiency of said cell has dropped 12% with a pure brine feed containing hardness impurities only in the complexed form and less than 2 milligrams per liter of other multivalent metallic impurities, no single other multivalent impurity being present at a concentration of more than 0.5 milligrams per liter until said current efficiency again rises substantially to the original current efficiency, thereafter feeding said impure brine to said cell intermittently with said pure brine feed so as to maintain the current efficiency of said cell at least 88% of the original cell current efficiency.

6. The method of claim 5 wherein said pure brine feed is made from said impure brine feed by utilizing ion exchange resin to reduce the contaminants to the stated levels.

7. The method of operating a membrane type electrolytic cell so as to maximize current efficiency during long-term continuous operation comprising feeding an impure electrolyte solution containing membrane contaminating quantities of multivalent metallic impurities to said cell until the membrane is contaminated and the cell's current efficiency has declined and replacing said impure electrolyte feed with a pure electrolyte feed containing less than 0.5 milligrams per liter of each multivalent metal contaminant found in said impure electrolyte feed which decontaminates said membrane and substantially recovers cell current efficiency, said replacement of the impure electrolyte feed with said pure electrolyte feed being made intermittently with sufficient frequency so as to prevent the current efficiency of the cell from dropping below 88% of the cell's original current efficiency.

8. The method of claim 7 wherein said pure electrolyte feed is made from said impure electrolyte feed by utilizing ion exchange resin to reduce the contaminants to the stated levels.

9. The method of operating a membrane type electrolytic cell so as to maximize current efficiency during longterm continuous operation comprising; feeding an impure electrolyte solution which has been treated with sufficient phosphate to complex dissolved hardness impurities therein and which contains membrane contaminating quantities of other polyvalent metallic impurities to said electrolytic cell until the membrane is contaminated and the cell's current efficiency decreases, intermittently replacing said impure electrolyte with a pure electrolyte feed which has been treated with sufficient phosphate to complex dissolved hardness impurities therein and which contains less than 0.5 milligrams per liter of each multivalent metal contaminant found in said impure electrolyte feed which decontaminates said membrane and substantially recovers cell current efficiency, said intermittent replacement of said impure electrolyte feed with said pure electrolyte feed being made with sufficient frequency so as to prevent the current efficiency of said cell from dropping below 88% of the cell's original current efficiency.

10. The method of claim 9 wherein said pure electrolyte feed is made from said impure electrolyte feed by utilizing ion exchange resin to reduce the contaminants to the stated levels.

11. The method of operating a membrane type electrolytic cell so as to maximize current efficiency during long-term continuous operation comprising, feeding to said cell an impure electrolyte solution containing multivalent metallic impurities which gradually contaminates the membrane in the cell and causes a loss in current efficiency, replacing said impure electrolyte feed before the current efficiency of said cell has dropped 12% with a pure electrolyte feed containing hardness impurities complexed with phosphates and less than 2 milligrams per liter of other multivalent metallic impurities, no single other multivalent impurity being present at a concentration of more than 0.5 milligrams per liter until said current efficiency again rises substantially to the original current efficiency, thereafter feeding said impure electrolyte to said cell intermittently with said pure electrolyte feed so as to maintain the current efficiency of said cell at least 88% of the original cell current efficiency.

12. The method of claim 11 wherein said pure electrolyte feed is made from said impure electrolyte feed by utilizing ion exchange resin to reduce the contaminants to the stated levels.

13. The method of rejuvenating a membrane in a membrane type electrolytic cell which has been contaminated with multivalent metallic impurities to the extent that the current efficiency has declined not more than 12% from its original level comprising replacing the impure electrolyte feed to said cell with a pure electrolyte feed containing less than 0.5 milligrams per liter of each multivalent metal contaminant found in said impure electrolytic feed while continuing electrolysis.

* * * * *